Dec. 14, 1926.
W. E. INGHAM ET AL
1,611,037
RELIEVING MECHANISM FOR LATHES
Filed Dec. 26, 1922   3 Sheets-Sheet 3
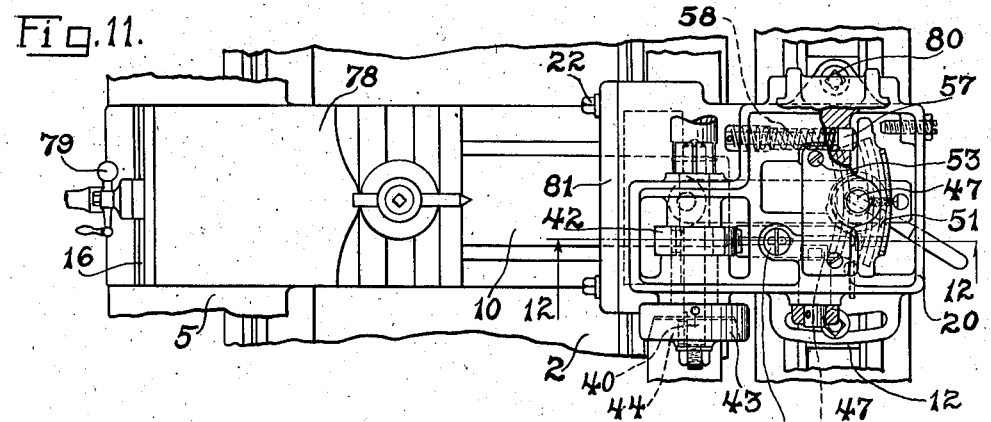
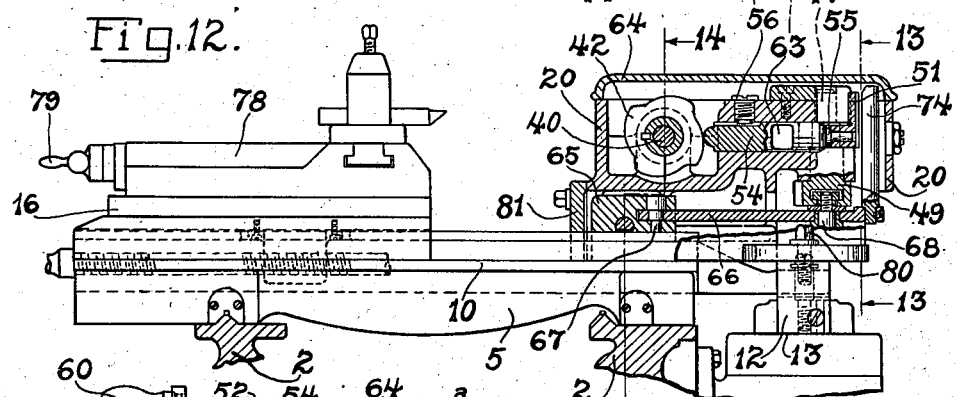
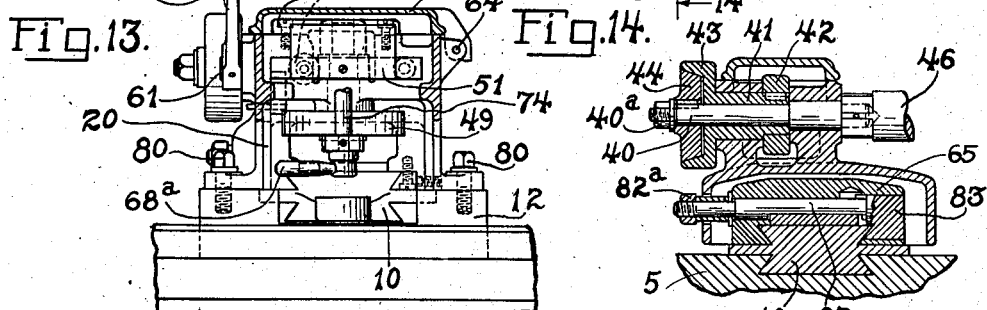
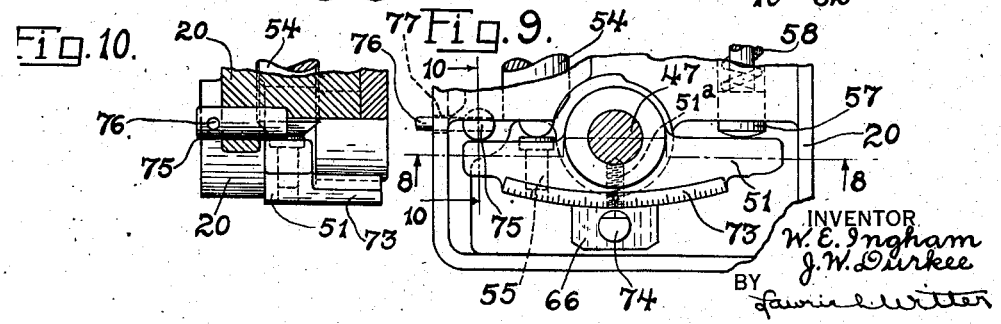
INVENTOR
W. E. Ingham
J. W. Durkee
BY
ATTORNEY Patented Dec. 14, 1926.

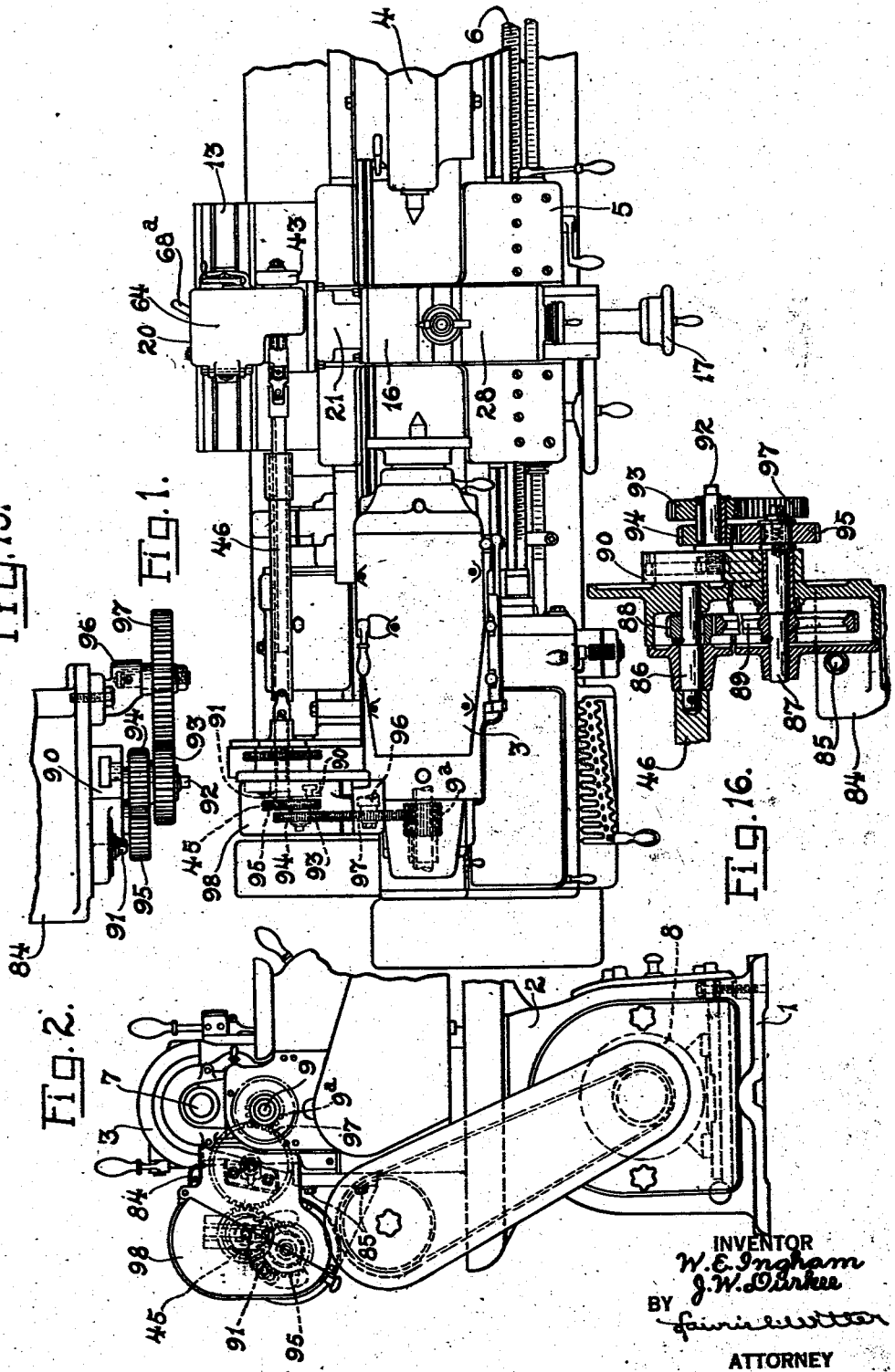

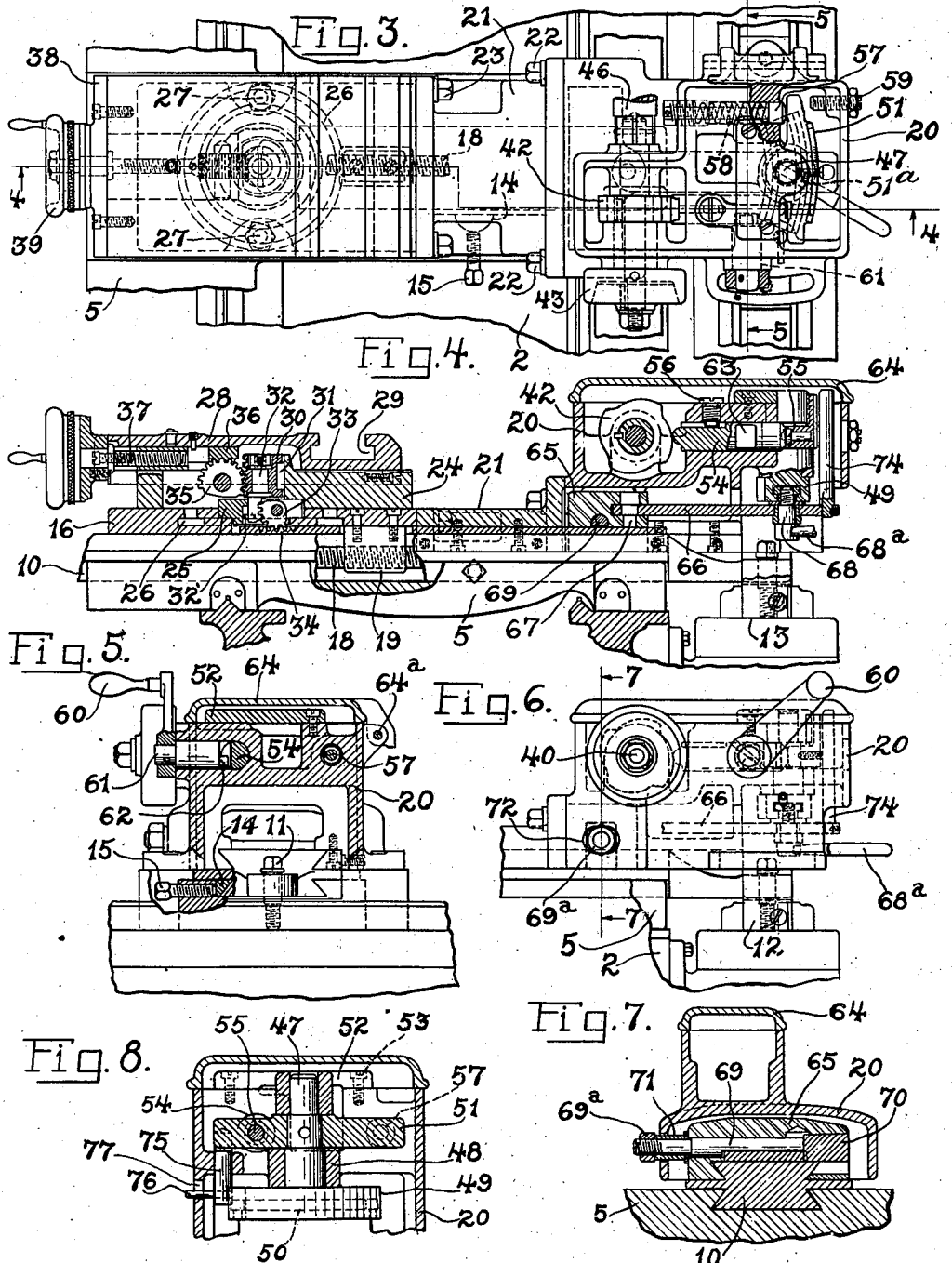

1,611,037

UNITED STATES PATENT OFFICE.

WALTER E. INGHAM, OF NEWINGTON, AND JAMES W. DURKEE, OF HARTFORD, CONNECTICUT, ASSIGNORS TO PRATT & WHITNEY COMPANY, OF NEW YORK, N. Y., A CORPORATION OF NEW JERSEY.

RELIEVING MECHANISM FOR LATHES.

Application filed December 26, 1922. Serial No. 609,030.

This invention relates to lathes and particularly to an improved relieving attaching therefor. It is the primary object of the invention to provide such an improved mechanism readily applicable to an ordinary lathe and particularly adapted to perform exterior and interior relieving operations upon various kinds of work such as milling cutters, hobs, taps, dies, reamers, etc.

It is an object of the invention to provide a universal relieving attachment comprising a swivel support and a tool slide to be mounted on the cross slide supported on the taper slide of a lathe, the support being angularly adjustable about the swivel center to any desired position, and means including a driven element coaxial of the swivel, a bar operatively connected thereto and means mounted on a support or housing on the rear end of the taper slide for reciprocating the bar and actuating the element to give relieving movements to the tool slide in any of its several adjusted positions about the swivel axis.

A further object of the invention is to provide a relieving attachment comprising relief operating mechanism adapted to cooperate with the taper slide and cross slide of a lathe, the cross slide being adapted to optionally receive thereon a plain tool slide slidable thereon or a swivel tool slide swivelly mounted thereon, and means for optionally connecting the said mechanism to the plain tool slide for giving plain relieving movements thereto or to the universal tool slide for giving relieving movements thereto in its various angular positions about the swivel axis. Such a construction provides a single relieving attachment adapted to optionally cooperate with a plain or a universal tool slide whereby the manufacture and use of such mechanisms are standardized and considerably simplified.

With the above and other objects in view, our invention consists in the features of construction and operation set forth in the following specification and illustrated in the accompanying drawings. In such drawings annexed hereto and forming a part of this specification, we have shown certain embodiments of our invention applied to a lathe but it will be understood that the invention can be otherwise embodied and that the drawings are not to be construed as defining or limiting the scope of the invention, the claims appended to this specification being relied upon for that purpose.

Referring to the figures of the drawings:

Figure 1 is a partial plan view of a lathe equipped with our improved relieving mechanism.

Fig. 2 is a headstock end elevation thereof.

Fig. 3 is a fragmentary plan view of the tool carriage showing our improved relieving attachment mounted thereon and in cooperating relation with a universal tool slide supported by the carriage.

Fig. 4 is a longitudinal sectional view therethrough on line 4—4 of Fig. 3.

Fig. 5 is a transverse sectional view on line 5—5 of Fig. 3.

Fig. 6 is a side elevation of the relief operating mechanism.

Fig. 7 is a sectional view on line 7—7 of Fig. 6.

Fig. 8 is a sectional view approximately on line 8—8 of Fig. 9.

Fig. 9 is a fragmentary enlarged plan view of one end of the auxiliary slide.

Fig. 10 is a fragmentary sectional view on line 10—10 of Fig. 9.

Fig. 11 is a view similar to Fig. 3 but showing a plain tool slide supported by the carriage and in cooperating relation with the relieving attachment.

Fig. 12 is a side elevation thereof partially in section on line 12—12 of Fig. 11.

Fig. 13 is an end elevation of the relief operating mechanism on line 13—13 of Fig. 12.

Fig. 14 is a transverse sectional view on line 14—14 of Fig. 12.

Fig. 15 is an enlarged fragmentary plan view of the gearing for operating the relieving mechanism.

Fig. 16 is a longitudinal sectional view thereof.

The relieving attachment comprising our invention is similar in some respects to that shown in copending applications Serial Nos. 539,523 and 539,524, filed February 27, 1922, the mechanisms illustrated in such applications however each being applicable only to a universal relieving tool slide and a plain relieving tool slide respectively. As above stated our improved relieving mechanism is applicable to both a universal and a plain tool slide.

In the drawings, 1 indicates the base of a lathe supporting a bed 2 thereon. A headstock 3 and a tailstock 4 are mounted on the bed and a tool carriage 5 is slidably mounted on the ways of the bed. The tool carriage 5 may be moved longitudinally on its ways by means of a screw 6. A lathe spindle 7 is mounted in the headstock 3 and is driven from a motor 8 in the base as specifically disclosed in application Serial No. 513,167. Also, as illustrated in detail in such application, a carriage and tool slide feeding shaft 9 is driven from the spindle 7. The relieving mechanism herein disclosed is adapted to be driven from a pinion 9ª (marked 20 in application 513,167) on this shaft. The lathe which is more fully described in the last above cited application, aside from the relieving attachment illustrated, comprises no part of the present invention and therefore will not be further described herein.

On Sheet 2 of the drawings, the carriage 5 is illustrated as provided with the usual taper slide 10 secured by a bolt 11 to a former or taper bar 12 riding in the groove 13 of the former or taper attachment. It should be understood, however, that if desired, the bolt 11 or the taper attachment may be removed and the taper slide secured against movement in the carriage by means of a shoe 14 adapted to be forced into gripping contact with the taper slide by means of a screw 15 threaded into the carriage. A cross slide 16 is mounted on the taper slide. The cross slide is adjustable by means of a hand wheel 17 and a screw 18 journaled in the taper slide and threadedly engaging a nut 19 depending from the cross slide. A support or housing 20 is also mounted on the taper slide to the rear of the cross slide and is secured to the cross slide by means of an intermediate element 21 and bolts 22 and 23.

In Figs. 3 and 4, a swivel support 24 is illustrated as mounted on the cross slide for swivelling movement about a circular block 25 seated therein. The cross slide is provided with a T-slot 26 concentric about the block, bolts 27 in the support extending into such slot whereby the support may be adjusted about the block as a center and secured in any adjusted position. A tool slide 28 having a tool post receiving T-slot 29 therein is mounted for sliding movement on the support.

At its swivel center directly over the block 25 the support 24 is provided with an axially movable bushing 30 having rack teeth on one side thereof and splined by means of a key 31 for vertical axial movement in the support 24. Journaled centrally within the bushing is a bolt 32 having a lower extension provided with rack teeth thereon. A pin 32' in the bolt 32 engages in a notch in the block 25 whereby such block is removable bodily with the support 24 and bolt 32. A gear segment 33 pivoted in block 25 is in mesh with such rack teeth and with similar rack teeth in the end of a bar 34 slidably mounted on the taper slide.

A gear segment 35 pivoted in the support 24 is in mesh with the rack teeth on the bushing 30 and with a rack 36 secured to the tool slide 28 by means of a screw 37. The screw is journaled within a plate 38 mounted on the end of the slide and the screw may be rotated by means of a hand wheel 39 thereon. It will be noted (Fig. 4) that the screw is in threaded engagement with a portion of the rack 36 whereby rotation of the screw moves the slide 28 on the support 24 relative to the swivel axis 32.

The housing 20 is of box-like form and is adapted to seat on the rear end of the taper slide 10. A shaft 40 is mounted in the housing and on a reduced end thereof is loosely mounted a sleeve 41 (Fig. 14). A cam wheel 42 is keyed to one end of the sleeve and the other end thereof is formed into the outer element 43 of a friction clutch, the inner element 44 of the clutch being keyed to the shaft. By tightening the nut 40ª, the clutch elements are secured together whereby the cam 42 is driven from the shaft. The shaft is driven from the before mentioned pinion 9ª through gearing indicated at 45 and from thence through a telescopic shaft 46 to the shaft 40. The function of the friction elements 43 and 44 is to provide for a relative rotary adjustment between the cam 42 and shaft 40.

A shaft 47 is supported vertically in a bearing 48 of the housing 20 rearwardly of the shaft 40 (Fig. 8). An arcuately shaped T-head 49 is formed on the lower end of this shaft and is provided with a T-slot 50 within its lower face. A cross arm 51 is secured to the shaft above the bearing 48 by means of a screw 51ª. The upper end of the shaft is rotatably supported in a bearing in a plate 52 secured to the housing by screws 53.

A cam follower 54 is slidably mounted in the housing 20 and one end thereof seats against a hardened shoe 55 in one end of the cross arm 51, the other end of the follower being adapted to engage against the cam wheel. A screw 56 engaging within a groove in the follower prevents the follower from rotating. A plunger 57 mounted in the housing is normally forced against the other end of the cross arm 51 by means of a spring 58 whereby the cross arm is normally swung about the shaft 47 in a direction to engage the follower 54 with the cam. A screw stop 59 is mounted in the housing for positively limiting the movement of the cross arm in this direction. From the mechanism just described, it will be seen that the shaft 47 is rotated positively in one direction by the cam 42 and resiliently in the opposite direction by the spring 58.

The cam follower 54 may be disengaged from the cam wheel and held so disengaged by means of a handle 60. This handle is mounted on a shaft 61 rotatable in the housing 20 and provided on its inner end with an eccentrically mounted lug 62 engaging within a notch 63 in the follower. It will be understood that the movement of the follower in operation is very slight and the notch 63 is sufficiently large (Fig. 3) to permit such movement freely without interference by the lug 62. To withdraw the follower from the cam against the action of the spring 58, the operator rotates the handle whereupon the lug 62 engages the rear wall of the notch and forces the follower rearwardly. The operating parts of the mechanism within the housing 20 are protected by a cover plate 64 pivoted at 64ᵃ thereon.

Slidably mounted on the taper slide within the support or housing 20 is an element 65. A plate or bar 66 is pivoted at 67 to one end of this element and connected by means of a screw 68 to the T-head 49 at its other end. The screw 68 threadedly engages a T-bushing within the T-slot 50 and the screw may be rotated by means of a handle 68ᵃ. It will be understood that the element 65 is reciprocated from the rocking movement of the shaft 47 and that the amount of reciprocation imparted to such element may be varied by adjusting the screw 68 and its bushing along the T-slot 50 toward and from the axis of the shaft 47. Furthermore the element 65 is positively moved in one direction when the screw 68 is on one side of the shaft 47 and is positively moved in the opposite direction when the screw is on the other side of such shaft. The element 65 may be clamped to the bar 34 by means of a bolt 69 having a head 70 to engage against the bar. A bushing 71 on the threaded end of the bolt extends through an elongated opening 72 in the housing 20. This bushing forms a thrust bearing between the element 65 and the nut 69ᵃ whereby the head 70 may be drawn into clamping engagement with the bar by tightening the nut.

Extending upwardly from the cross arm 51 is an integral projection 73 having the top surface thereof graduated from a zero central position thereon outwardly in both directions (Fig. 9). A post 74 mounted on the outer end of the bar 66 extends upwardly to a position adjacent the said graduations on the projection 73 and is provided with an index mark on the upper end thereof cooperating with such graduations. The purpose of these graduations is to provide means whereby the screw 68 may be accurately adjusted and set in the proper position along the slot 50 for giving the desired amount of relieving movement.

Since the graduated projection 73 moves about the axis of shaft 47 and the index post 74 moves with the bar 66 about the pivotal axis 67, the shaft 47 and the bar 66 must be brought to a mid position with the axis 67, the zero on the projection 73 and the index mark on the post 74 in alignment (Fig. 9.), when it is desired to adjust the screw along the T-slot 50 to accurately provide for the proper amount of relieving movement. A vertically sliding block 75 is provided for holding the shaft 47 in this position. The block may be lifted vertically by means of a pin 76 seated therein and extending through an elongated slot 77 in the housing. To seat the block in position for thus holding the shaft 47, the operator forces the cam follower in a direction to compress the spring 58 and leave an opening between the arm 51 and the housing. The block 75 is then lifted upwardly from the position shown in Fig. 8 to extend between the arm 51 and the housing, as shown in Figs. 9 and 10. The follower is then released and the action of the spring 58 causes the block to be gripped between the said arm and housing with the arm in the said mid position. Upon the continued operation of the cam, after the screw 68 has been adjusted and set, the cam follower moves the arm in a direction to compress the spring 58 and the block 75 drops down out of the path of movement of the cam.

The mechanism as thus far described comprises a universal relieving attachment which may perform either plain or universal relieving operations. The mechanism being assembled as shown in Figs. 3 and 4 of the drawings, the following adjustments are made thereto: The taper slide may either be secured to the taper bar 12 by the bolt 11 or to the carriage 5 by means of the screw 15. The shaft 47 and post 74 are placed in the mid position as above described and the screw 68 is adjusted along the slot 50 and set in the desired position. The distance of such screws from the axis of shaft 47 determines the amount of relieving movement given and it should furthermore be understood that for external relieving operations the screw is adjusted to one side of such axis and for internal relieving operations the screw is adjusted to the opposite side thereof. The tool is adjusted to the work by rotating the hand wheels 17 and 39.

The rotation of the shaft 40 and cam 42 together with the spring 58 rocks the shaft 47. A reciprocating movement is transmitted to the element 65 and bar 34 by means of the bar 66 connecting the element 65 with the T-head 49. The reciprocation of bar 34 operates through the gear segment 33 to reciprocate the bushing 30 vertically, the tool slide 28 being reciprocated therefrom through the gear segment 35 and rack 36. It will be understood that the swivel support 24 together with the tool slide 28 and bushing 30 may swivel bodily to any degree about the pin 32 and that the connection from the cam 42 to the tool slide 28 remains operative in all such positions.

As heretofore stated, the relieving attachment comprising this invention as above stated, is adapted to be used in connection with either a universal tool slide or a plain tool slide. In Figs. 11 to 14 of the drawings, we have illustrated the same relieving attachment above described operatively connected to a plain tool slide 78 supported on the cross slide 16. A handle 79 mounted on a screw within the tool slide 78 provides means for moving such slide on the cross slide.

When using the relieving attachment in connection with the plain tool slide 78, as shown in Figs. 11 to 14, the support 20 instead of being connected to the cross slide is connected to the taper bar 12 by means of tap bolts 80, the bolt 11 connecting the taper slide to the taper bar of course being removed. A cover plate 81 is mounted over the end of the support or housing 20 in place of the connecting element 21 shown in Figs. 3 and 4. Furthermore the element 65 instead of being connected to the bar 34 is connected to the taper slide by means of a bolt 82 having a hook-shaped head 83. Otherwise the mechanism is the same as illustrated in Figs. 3 to 10 inclusive.

The operation of the mechanism shown in Figs. 11 to 14 as follows: The support 20 with its shaft 40 and cam wheel 42 is anchored to the taper bar. The rotation of the cam 42 reciprocates the element 65 which reciprocates the taper slide and the cross slide and tool slide thereon. The relief operating mechanism is adjusted for internal and external relieving and for varying the amount of relieving movement in the manner heretofore described. It will furthermore be noted that since the support 20 is connected to the taper bar 12, the work will be relieved along a line conforming to the adjustment of the taper guideway 13.

In Figs. 1, 2, 15 and 16, we have illustrated in detail the gearing, indicated generally at 45, for driving the relieving mechanism through the telescopic shaft 46. A supporting housing 84 is secured to the lathe bed by means of bolts 85. A pair of shafts 86 and 87 are rotatably mounted in this housing, the shaft 86 being directly connected to the telescopic shaft 46. Shafts 86 and 87 are operatively connected together by gears 88 and 89. Mounted for rotary adjustment on a bushing about the shaft 87 is a change gear bracket arm 90. A bolt 91 is provided for securing the arm in adjusted position. A stud 92 adjustably mounted in a radial T-slot in the arm rotatably supports a bushing thereon carrying gears 93 and 94, gear 94 being in mesh with a gear 95 on the shaft 87. An arm 96 on the housing supports a gear 97 in mesh with the pinion 9ª on the feed shaft 9. The arm 90 may be adjusted about the shaft 87 in a manner to mesh its gear 93 with this gear 97 whereby a driving connection is established from the feed shaft 9 to the telescopic shaft 46.

It will be understood that the rotation of the telescopic shaft 46 relative to the feed shaft 9 may be changed as desired by means of the change gears 93, 94 and 95. Furthermore, when it is not desired to use the relieving mechanism the gear 93 may be withdrawn from meshing engagement with the gear 97 merely by loosening the bolt 91. The housing is provided with a cover plate 98 pivoted thereon whereby easy access to the gearing is assured.

The direction of feed of the tool carriage and tool slide is dependent upon the direction of rotation of the feed shaft 9. Since the relieving mechanism is driven from this shaft, the relieving operations of the tool will always follow the feeding movement of the tool and tool carriage, in whichever direction such movement may be. Such arrangement is of particular advantage when operating on spiral fluted hobs or milling cutters since the tool is always held in correct relation to the cutter teeth being relieved. Furthermore, the speed of relieving movement relative to the spindle rotation may be changed as desired by means of the change gears 93, 94 and 95 whereby hobs having any number of flutes may be accurately relieved.

What we claim is:

1. In combination with a lathe comprising a bed, a tool carriage slidable thereon, a taper slide on the carriage, a cross slide on the taper slide and a tool slide on the cross slide, of a support on the taper slide secured to the cross slide, a bar extending longitudinally of the taper slide and operatively connected to the tool slide, and means on the support for reciprocating the bar to give relieving movements to the tool slide.

2. In combination with a lathe comprising a bed, a tool carriage slidable thereon, a taper slide on the carriage, a cross slide on the taper slide and a tool slide on the cross slide, of a support on the taper slide secured to the cross slide, a bar extending longitudinally of the taper slide and operatively connected to the tool slide, means on the support including a rotary cam for reciprocating the bar to give relieving movements to the tool slide, and means for varying the length of relieving movement imparted to the tool slide.

3. In combination with a lathe comprising a bed, a tool carriage slidable thereon, a taper slide on the carriage and a cross slide on the taper slide, of a tool slide swivelly supported on the cross slide, a support on the taper slide secured to the cross slide, a tool slide actuating element arranged coaxially of the swivel and operatively connected to the tool slide, a bar extending longitudinally of the taper slide and operatively connected to the element, and means on the support for reciprocating the bar to give relieving movements to the tool slide.

4. In combination with a lathe comprising a bed, a tool carriage slidable thereon, a taper slide on the the carriage, a cross slide on the taper slide and a headstock on the bed provided with gearing therein, a tool slide swivelly supported on the cross slide, a housing on the taper slide secured to the cross slide, a tool slide actuating element arranged coaxially of the swivel and operatively connected to the tool slide, a bar extending longitudinally of the taper slide and operatively connected to the element, and means in the housing including a rotary cam operated by the said gearing for reciprocating the bar to give relieving movements to the tool slide.

5. In combination with a lathe comprising a bed, a tool carriage slidable thereon, a taper slide on the carriage and a cross slide on the taper slide, of a tool slide swivelly supported on the cross slide, a support on the taper slide secured to the cross slide, an axially movable tool slide actuating element arranged coaxially of the swivel and operatively connected to the tool slide, a bar extending longitudinally of the taper slide and operatively connected to the element, and means on the support for reciprocating the bar and element to give relieving movements to the tool slide.

6. In a relieving attachment for a lathe, the combination with a bed, a tool carriage thereon and a cross slide on the carriage, of a tool slide on the cross slide, a bar extending along the cross slide and operatively connected to the tool slide, and means at one end of the bar for reciprocating the bar to give relieving movements to the tool slide relative to the cross slide.

7. In a relieving attachment for a lathe, the combination with a bed, a tool carriage thereon and a cross slide on the carriage, of a tool slide on the cross slide, a bar extending along the cross slide and operatively connected to the tool slide, and means at one end of the bar including a cam for positively moving the bar in one direction and a spring for moving the bar in the opposite direction to give relieving movements to the tool slide.

8. In a relieving attachment for a lathe, the combination with a bed, a tool carriage thereon and a cross slide on the carriage, of a tool slide on the cross slide, a bar extending along the cross slide and operatively connected to the tool slide, means at one end of the bar including a cam for positively moving the bar in one direction and a spring for moving the bar in the opposite direction to give relieving movements to the tool slide, and means for adjusting the last named means to positively move the bar in either direction.

9. In a relieving attachment for a lathe, the combination with a bed, a tool carriage thereon and a cross slide on the carriage, of a tool slide on the cross slide, a bar extending along the cross slide and operatively connected to the tool slide, means including a rotary cam at one end of the bar for reciprocating the bar in opposite directions to give relieving movements to the tool slide, and means for rendering the cam inoperative on the bar.

10. In a relieving attachment for a lathe, the combination with a bed, a tool carriage thereon and a cross slide on the carriage, of a tool slide on the cross slide, a bar extending along the cross slide and operatively connected to the tool slide, a pivotally mounted element connected to the cross slide, means operatively connecting the bar to the element, the last said means being adjustable toward and from the pivotal axis of the element whereby to vary the amount of relieving movement imparted to the tool slide, and means for rocking the element about its pivotal axis.

11. In a relieving attachment for a lathe, the combination with a bed, a tool carriage thereon and a cross slide on the carriage, of a tool slide on the cross slide, a bar extending along the cross slide and operatively connected to the tool slide, a pivotally mounted element connected to the cross slide, means operatively connecting the bar to the element, and means for rocking the element about its pivotal axis positively in one direction, the first named means being adjustable to opposite sides of the pivotal axis of the element whereby to reverse the direction of positive relieving movement imparted to the tool slide.

12. In a relieving attachment for a lathe, the combination with a bed, a tool carriage thereon and a cross slide on the carriage, of a tool slide on the cross slide, a bar extending along the cross slide and operatively connected to the tool slide, a pivotally mounted element connected to the cross slide, means operatively connecting the bar to the element, and means including a rotary cam for rocking the element about its pivotal axis, the first named means being adjustable toward and from the pivotal axis of the element whereby to vary the relieving movement imparted to the tool slide.

13. In a relieving attachment for a lathe, the combination with a bed, a tool carriage thereon and a cross slide on the carriage, of a tool slide on the cross slide, a bar extending along the cross slide and operatively connected to the tool slide, a rotary cam, a drive shaft rotating the cam, a cam follower cooperating with the bar and adapted to engage the cam for giving relieving movements to the tool slide, and means for rotatably adjusting the cam relative to its driving shaft.

14. In a relieving attachment for lathes, the combination with a bed, a tool carriage thereon, a taper slide on the carriage, a cross slide on the taper slide and a tool slide on the cross slide, of a movable element on the taper slide, means on the taper slide for moving the element positively in one direction, means for moving the element in the opposite direction, and means for connecting the element either to the taper slide for giving relieving movements thereto or to the tool slide for giving relieving movements thereto on the cross slide.

15. In a relieving attachment for lathes, the combination with a bed, a tool carriage thereon, a taper slide on the carriage, a cross slide on the taper slide and a tool slide on the cross slide, of a movable element on the taper slide, means for reciprocating the element, means for varying the amount of such reciprocation, and means for connecting the element either to the taper slide for giving relieving movements thereto or to the tool slide for giving relieving movements thereto on the cross slide.

16. In a relieving attachment for lathes, the combination with a bed, a tool carriage thereon, a taper slide on the carriage, a cross slide on the taper slide, of a movable element on the taper slide, a support on the taper slide, means including a cam on the support for reciprocating the element, and means for operatively connecting the element to the tool slide for giving relieving movements thereto on the cross slide or rigidly connecting the element to the taper slide for giving relieving movements thereto.

17. In a relieving attachment for lathes, the combination with a bed, a tool carriage thereon, a taper slide on the carriage, a cross slide on the taper slide and a tool slide on the cross slide, of a support on the taper slide, an element slidable on the taper slide within the support, means including a cam on the support and a spring for reciprocating the element, and means for operatively connecting the element to the tool slide for giving relieving movements thereto on the cross slide or rigidly connecting the element to the taper slide for giving relieving movements thereto.

18. A relieving mechanism comprising the combination of a slide, a swivel support thereon, a tool slide mounted for sliding movement on the support, an element arranged coaxially of the swivel, means in the first said slide operatively connected to the element for reciprocating the same axially in both directions, and mechanism connecting the tool slide with the element for reciprocating the tool slide, the support being angularly adjustable about the swivel axis and the several elements being operative to reciprocate the tool slide in the various adjusted positions of the support.

19. A relieving mechanism comprising the combination of a slide, a swivel support thereon, a tool slide mounted for sliding movement on the support, an element arranged coaxially of the swivel, a sliding rack in the first said slide operatively connected to the element for reciprocating the same axially, and mechanism including a rack and pinion connecting the tool slide with the element for reciprocating the tool slide, the support being angularly adjustable about the swivel axis and the several elements being operative to reciprocate the tool slide in the various adjusted positions of the support.

20. A relieving mechanism comprising the combination of a slide, a swivel support thereon, a tool slide mounted for sliding movement on the support, an element arranged coaxially of the swivel, means in the first said slide operatively connected to the element for reciprocating the same axially, mechanism connecting the tool slide with the element for reciprocating the tool slide, and mechanism for operating the said means to reciprocate the element positively in either direction and resiliently in the other direction, the support being angularly adjustable about the swivel axis and the several parts being operative to reciprocate the tool slide in the various adjusted positions of the support.

21. A relieving mechanism comprising the combination of a slide, a swivel support thereon, a tool slide mounted for sliding movement on the support, an element arranged coaxially of the swivel, means in the first said slide operatively connected to the element for reciprocating the same axially, mechanism connecting the tool slide with the element for reciprocating the tool slide, mechanism for operating the said means, and means for varying such operation to vary the extent of the said reciprocation, the support being angularly adjustable about the swivel axis and the several parts being operative to reciprocate the tool slide in the various adjusted positions of the support.

22. A relieving mechanism comprising the combination of a slide, a swivel support thereon, a tool slide mounted for sliding movement on the support, an element arranged coaxially of the swivel, means in the first said slide operatively connected to the element for reciprocating the same axially, an intermeshing rack and pinion on the tool slide, a screw operatively connecting the rack to the tool slide, and rack teeth on the said element engaging the pinion, the support being angularly adjustable about the swivel axis and the several elements being operative to reciprocate the tool slide in the various adjusted positions of the support.

In testimony whereof, we hereto affix our signatures.

WALTER E. INGHAM.
JAMES W. DURKEE.